US012767575B2

(12) United States Patent
Suzuki et al.

(10) Patent No.: US 12,767,575 B2
(45) Date of Patent: Oct. 20, 2026

(54) METHOD FOR MANUFACTURING GLASS PARTICLE DEPOSIT AND DEVICE FOR MANUFACTURING GLASS PARTICLE DEPOSIT

(71) Applicant: SUMITOMO ELECTRIC INDUSTRIES, LTD., Osaka (JP)

(72) Inventors: Tomoya Suzuki, Osaka (JP); Toshimi Habasaki, Tochigi (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 114 days.

(21) Appl. No.: 18/755,907

(22) Filed: Jun. 27, 2024

(65) Prior Publication Data

US 2024/0343631 A1 Oct. 17, 2024

(30) Foreign Application Priority Data

Jul. 26, 2023 (JP) ................................ 2023-121672

(51) Int. Cl.
*C03B 19/14* (2006.01)
*B01D 46/58* (2022.01)

(52) U.S. Cl.
CPC .......... *C03B 19/1423* (2013.01); *B01D 46/58* (2022.01); *B01D 2279/51* (2013.01); *C03B 2207/42* (2013.01)

(58) Field of Classification Search
None
See application file for complete search history.

(56) References Cited

U.S. PATENT DOCUMENTS 6,845,636 B2 * 1/2005 Yamazaki ........... C03B 37/0146 65/427
7,143,612 B2 * 12/2006 Ishihara .............. C03B 37/0146 65/424

FOREIGN PATENT DOCUMENTS

| | | | | | |
|---|---|---|---|---|---|
| CN | 113943102 A | * | 1/2022 | C03B 37/0144 |
| CN | 116209640 A | * | 6/2023 | C03B 37/01453 |
| JP | 2000319024 A | * | 11/2000 | C03B 37/01406 |
| JP | 2003277073 A | * | 10/2003 | C03B 37/01406 |
| JP | 2004099353 A | * | 4/2004 | C03B 37/0144 |
| JP | 2012-166992 A | | 9/2012 | |

OTHER PUBLICATIONS

PE2E machine translation JP2007131487 (Year: 2007).*
PE2E machine translation JP2013040064 (Year: 2013).*
PE2E machine translation JP-2003277073 (Year: 2003).*
PE2E machine translation JP 2004099353 (Year: 2004).*

* cited by examiner

*Primary Examiner* — Jodi C Franklin
(74) *Attorney, Agent, or Firm* — McDonald Hopkins LLC

(57) ABSTRACT

A method for manufacturing a glass particle deposit according to one aspect of the present disclosure includes manufacturing the glass particle deposit by producing glass particles through a hydrolysis reaction using flame of a burner and depositing the glass particles on a target in a reaction container, and taking out the glass particle deposit from the reaction container and transporting the glass particle deposit to a clean room. Air is introduced into the clean room through a clean room filter that removes particles in the air. When the glass particle deposit is manufactured, air is introduced from a space different from the clean room into the reaction container through a reaction container filter.

5 Claims, 4 Drawing Sheets

METHOD FOR MANUFACTURING GLASS PARTICLE DEPOSIT AND DEVICE FOR MANUFACTURING GLASS PARTICLE DEPOSIT

CROSS-REFERENCE TO RELATED APPLICATION

This application claims priority from Japanese Patent Application No. 2023-121672, filed on Jul. 26, 2023, the entire subject matter of which is incorporated herein by reference.

TECHNICAL FIELD

The present disclosure relates to a method for manufacturing a glass particle deposit and a device for manufacturing a glass particle deposit.

BACKGROUND

JP2012-166992A discloses a method for manufacturing a glass particle deposit.

SUMMARY

JP2012-166992A discloses a method for manufacturing a glass particle deposit in which clean air is supplied to an external container that covers a reaction container where glass particles are deposited on a target. By supplying clean air to the external container, attachment of foreign matter to the glass particle deposit can be prevented.

Incidentally, in a device for manufacturing the glass particle deposit, clean air may be introduced from a clean room. In the clean room, the cleanliness is adjusted by a filter. In addition, a plurality of reaction containers may be connected to a common clean room.

The filter used for introducing air into the clean room is appropriately replaced. At this time, the operations of all the reaction containers of glass particle deposits connected to the clean room are stopped.

The present disclosure provides a method for manufacturing a glass particle deposit and a device for manufacturing a glass particle deposit in which an overall operation rate of manufacturing facilities is improved.

An embodiment of the present disclosure provides a method for manufacturing a glass particle deposit, the method including:

- manufacturing the glass particle deposit by producing glass particles through a hydrolysis reaction using flame of a burner and depositing the glass particles on a target in a reaction container; and
- taking out the glass particle deposit from the reaction container and transporting the glass particle deposit to a clean room,
- wherein air is introduced into the clean room through a clean room filter that removes particles in the air, and
- when the glass particle deposit is manufactured, air is introduced from a space different from the clean room into the reaction container through a reaction container filter.

An embodiment of the present disclosure provides a device for manufacturing a glass particle deposit, the device including:

- a reaction container where glass particles are produced through a hydrolysis reaction using flame of a burner and are deposited on a target to manufacture a glass particle deposit; and
- a transport machine configured to transport the manufactured glass particle deposit to a clean room where cleanliness is adjusted,
- wherein the reaction container includes
- an introduction duct that is opened to a space different from the clean room to introduce air into the reaction container, and
- a reaction container filter that is provided in the introduction duct and removes particles in the air introduced into the reaction container.

The present disclosure can provide a method for manufacturing a glass particle deposit and a device for manufacturing a glass particle deposit in which an overall operation rate of manufacturing facilities is improved.

DESCRIPTION OF EMBODIMENTS

Description of Embodiment of Present Disclosure

Figure 1:
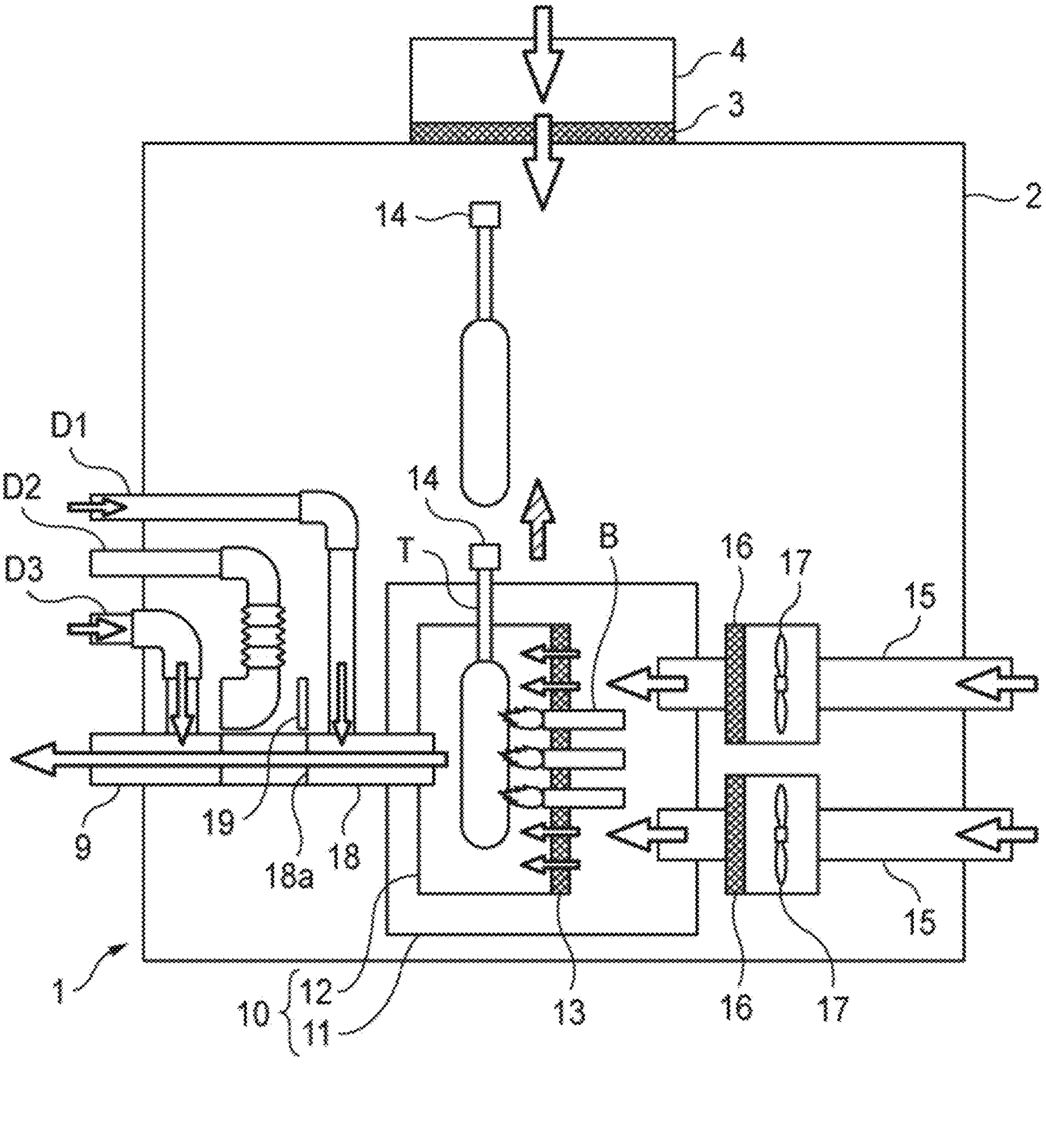
FIG. 1 is a diagram illustrating a state of a deposition step of a glass particle deposit manufacturing device according to a first embodiment.

First, aspects of the present disclosure will be described.

(1) A method for manufacturing a glass particle deposit according to one aspect of the present disclosure includes:

- manufacturing the glass particle deposit by producing glass particles through a hydrolysis reaction using flame of a burner and depositing the glass particles on a target in a reaction container; and
- taking out the glass particle deposit from the reaction container and transporting the glass particle deposit to a clean room,
- in which air is introduced into the clean room through a clean room filter that removes particles in the air, and
- when the glass particle deposit is manufactured, air is introduced from a space different from the clean room into the reaction container through a reaction container filter.

With this configuration, air to be introduced into the reaction container is introduced from the space different from the clean room. Since the air to be introduced into the reaction container passes through the reaction container filter, the cleanliness of the air to be introduced into the reaction container can be adjusted. Since the amount of air passing through the clean room filter is reduced, the frequency of operation stop of the reaction container caused by replacement of the clean room filter is also reduced. Therefore, the overall operation rate of manufacturing facilities can be improved.

(2) Air may be introduced into the clean room through an air conditioner capable of adjusting a temperature and a humidity.

With this configuration, when the glass particle deposit is manufactured, consumption of air where the temperature and the humidity are adjusted is suppressed. Therefore, cost and labor relating to the operation of the air conditioner can be reduced.

(3) In the method for manufacturing a glass particle deposit according to (1) or (2), when the glass particle deposit is manufactured, air that is taken in from an introduction duct opened outdoors may be introduced into the reaction container.

With this configuration, outdoor air is directly introduced, and thus the method can be implemented with a simple configuration.

(4) In the method for manufacturing a glass particle deposit according to (1) or (2), when the glass particle deposit is manufactured, air that is taken in from an introduction duct opened to a room different from the clean room and the reaction container is introduced into the reaction container.

With this configuration, as compared to a case where air is directly taken in from outdoors, the effect of an outdoor environment such as outdoor wind can be reduced. In addition, when air is introduced into the room through a filter coarser than the reaction container filter, clogging of the reaction container filter can be suppressed.

(5) In the method for manufacturing a glass particle deposit according to any one of (1) to (4), when the glass particle deposit is manufactured, total heat exchange may be performed between the air introduced into the reaction container and the air in the clean room.

With this configuration, air introduced into the reaction container also contributes to the adjustment of the temperature and the humidity in the clean room. As a result, cost and labor relating to the operation of the air conditioner can be reduced.

(6) In the method for manufacturing a glass particle deposit according to any one of (1) to (5), an intake duct opened outdoors and an exhaust port of the reaction container may be switchably connected to an exhaust pipe, when the manufacturing of the glass particle deposit starts, the exhaust pipe may be connected to the exhaust port, and when the manufacturing of the glass particle deposit ends, the exhaust pipe may be connected to the intake duct to seal the exhaust port.

With this configuration, in a step other than a deposition step for manufacturing the glass particle deposit, air in the reaction container is not exhausted. Therefore, the lifetime of the reaction container filter increases.

(7) A device for manufacturing a glass particle deposit according to one aspect of the present disclosure includes:

- a reaction container where glass particles are produced through a hydrolysis reaction using flame of a burner and are deposited on a target to manufacture a glass particle deposit; and
- a transport machine configured to transport the manufactured glass particle deposit to a clean room where cleanliness is adjusted, in which the reaction container includes

- an introduction duct that is opened to a space different from the clean room to introduce air into the reaction container, and
- a reaction container filter that is provided in the introduction duct and removes particles in the air introduced into the reaction container.

With this configuration, air is introduced from the space different from the clean room into the reaction container. Therefore, consumption of air in the clean room can be suppressed. As a result, the lifetime of the clean room filter that adjusts the cleanliness in the clean room increase, and the frequency of operation stop of the reaction container caused by replacement of the clean room filter is also reduced. Therefore, the overall operation rate of manufacturing facilities can be improved.

Details of Embodiment of Present Disclosure

Specific examples of the method for manufacturing a glass particle deposit and the device for manufacturing a glass particle deposit according to an embodiment of the present disclosure will be described below with reference to the drawings. The present invention is not limited to these examples and is intended to include any modifications within the scope and meaning equivalent to the terms of the claims.

First Embodiment

Figure 2:
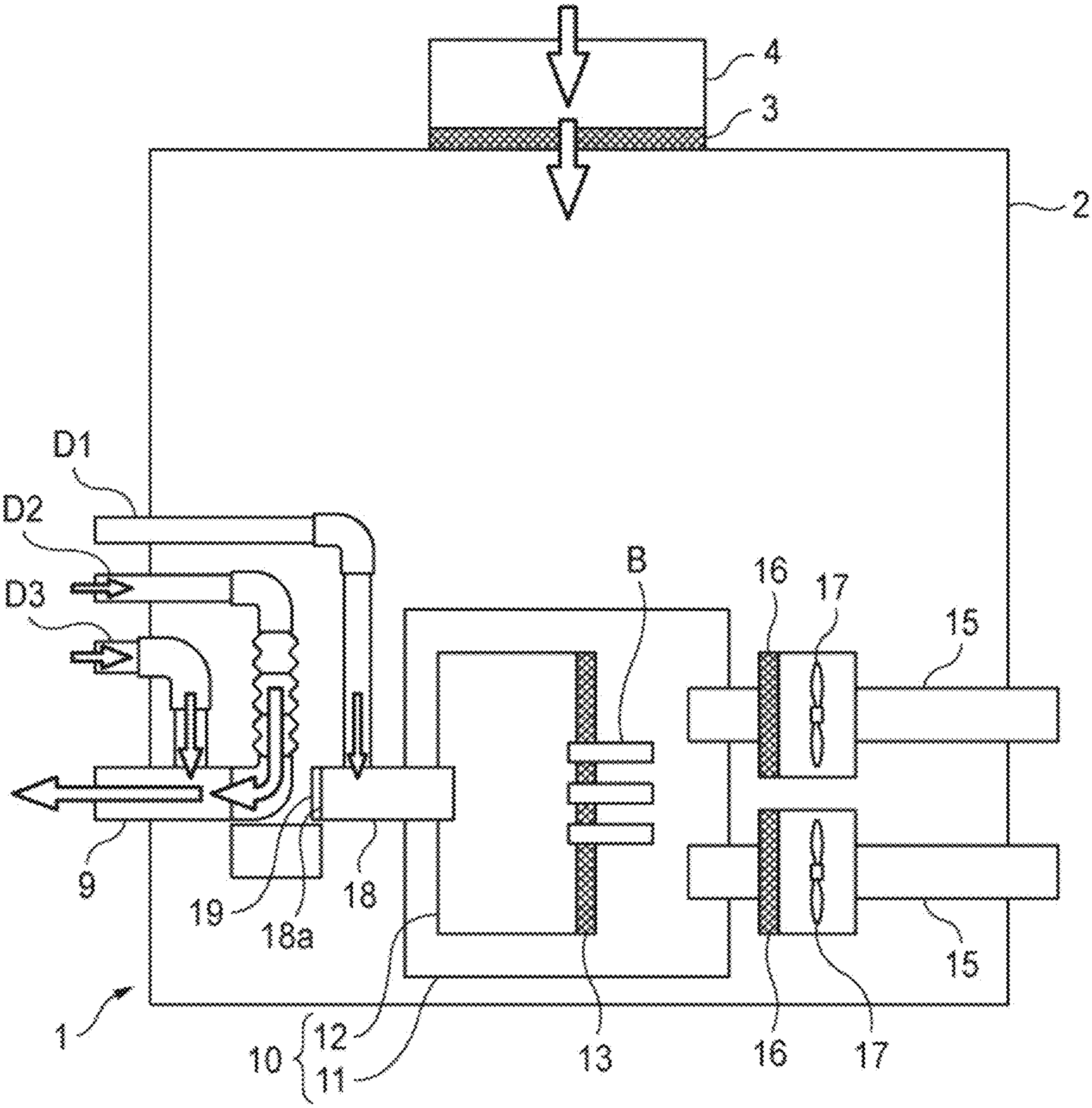
FIG. 2 is a diagram illustrating a state of a non-deposition step of the glass particle deposit manufacturing device according to the first embodiment.

FIG. 1 is a diagram illustrating a state where a deposition step is performed by a device 1 for manufacturing a glass particle deposit according to a first embodiment. FIG. 2 is a diagram illustrating a state where a non-deposition step is performed by the device 1 for manufacturing a glass particle deposit according to the first embodiment. As illustrated in FIGS. 1 and 2, the device 1 for manufacturing a glass particle deposit is accommodated in a clean room 2. In general, the clean room accommodates a plurality of reaction containers. However, in the drawings of the present disclosure, only one reaction container is illustrated.

The device 1 for manufacturing a glass particle deposit includes a reaction container 10 and a transport machine 14. The reaction container 10 includes an external container 11 and an internal container 12. The internal container 12 includes a burner B and a mesh-like wall portion 13. In the device 1 for manufacturing a glass particle deposit, glass particles are produced through a hydrolysis reaction using flame of the burner B and are deposited on a target T in the reaction container 10 to manufacture a glass particle deposit. In the device 1 for manufacturing a glass particle deposit according to the present embodiment, a glass particle deposit is manufactured using an OVD method of causing a plurality of burners B to reciprocate parallel to a direction in which the target T extends such that glass particles are deposited.

In the mesh-like wall portion 13, a plurality of mesh plates formed of a corrosion-resistant metal material such as nickel are laminated. In the deposition step of depositing the glass particles on the target T, the mesh-like wall portion 13 rectifies a flow of air flowing from the external container 11 into the internal container 12.

The transport machine 14 transports the target T into the clean room 2, transports the target T from the clean room 2 into the reaction container 10, or takes out the completed glass particle deposit from the reaction container 10 and transports the glass particle deposit to the clean room 2. The completed glass particle deposit is stored in the clean room 2.

In the clean room 2, air is introduced from outdoors through a clean room filter 3 to remove particles such that the cleanliness is maintained. As a result, attachment of impurity to the completed glass particle deposit can be suppressed.

In addition, in the present embodiment, the clean room 2 includes an air conditioner 4. By adjusting the temperature and the humidity of air introduced due to the operation of the air conditioner 4, the temperature and the humidity in the clean room 2 can be maintained to be fixed. When an inspection device is provided in the clean room 2, it is desirable to control the temperature and the humidity for fixed inspection accuracy. In addition, air in the clean room 2 that accommodates the glass particle deposit may contain hydrogen chloride. In this case, in order to suppress internal corrosion of the clean room 2 caused by hydrochloric acid produced due to dew condensation, it is desirable to adjust the humidity.

The reaction container 10 includes an introduction duct 15 for introducing air into the reaction container 10. In the present embodiment, two introduction ducts 15 are provided. One end of the introduction duct 15 is opened to a space between the external container 11 and the internal container 12. In the first embodiment, another end of the introduction duct 15 is opened outdoors. The outdoor environment is an example of the space different from the clean room 2.

In addition, the reaction container 10 includes a reaction container exhaust duct 18 for exhausting air in the reaction container 10. In FIG. 1, the reaction container exhaust duct 18 is connected to an exhaust pipe 9. However, as described below, in some cases, an exhaust port 18*a* of the reaction container exhaust duct 18 is sealed by a seal portion 19 (also refer to FIG. 2).

Further, in the clean room 2, a first intake duct D1, a second intake duct D2, and a third intake duct D3 of which one ends are opened outdoors are provided. The other end of the first intake duct D1 is connected to the reaction container exhaust duct 18. The other end of the third intake duct D3 is connected to the exhaust pipe 9.

As illustrated in FIGS. 1 and 2, the second intake duct D2 switches between a state where the other end of the second intake duct D2 is not connected to any duct and a state where the other end of the second intake duct D2 is connected to the exhaust pipe 9. More specifically, in the deposition step (that is, a state where the burner B is fired), the other end of the second intake duct D2 is not connected to any pipe. However, in the non-deposition step (that is, a state where the burner B is not fired), as described above, the exhaust port 18*a* of the reaction container exhaust duct 18 is sealed by the seal portion 19, and the second intake duct D2 moves such that the other end of the second intake duct D2 is connected to the exhaust pipe 9. In addition, along with the movement of the second intake duct D2, a connection pipe portion between the reaction container exhaust duct 18 and the exhaust pipe 9 moves.

The introduction duct 15 includes a reaction container filter 16. The reaction container filter 16 is provided such that air in the introduction duct 15 passes through the reaction container filter 16. In the present embodiment, two introduction ducts 15 are provided. Therefore, the reaction container filter 16 is provided in each of the two introduction ducts 15. In addition, as illustrated in FIG. 1, it is desirable that an introduction fan 17 is provided in the vicinity of the reaction container filter 16. Air blown by the introduction fan 17 passes through the reaction container filter 16 such that particles are removed from the air introduced into the reaction container 10. The reaction container filter 16 and the introduction fan 17 may be present in a space outside the clean room 2. In addition, the reaction container filter 16 does not need to be provided halfway the introduction duct 15. For example, the reaction container filter 16 and the introduction fan 17 may be provided in an opening portion of the introduction duct 15 (also refer to FIG. 3).

Next, a flow of air relating to the manufacturing device 1 according to the first embodiment will be described. As illustrated in FIG. 1, in the deposition step, outdoor air is introduced from the introduction duct 15 due to the operation of the introduction fan 17. In the air in the introduction duct 15, particles are removed by the reaction container filter 16 present in the halfway path. The air where the particles are removed such that the cleanliness is improved is fed into the external container 11. The air in the external container 11 is introduced into the internal container 12 through the mesh-like wall portion 13. The air fed into the reaction container 10 is exhausted from the exhaust pipe 9 through the reaction container exhaust duct 18 together with gas produced in the deposition step. At this time, the air is exhausted from the reaction container 10 while being mixed with air introduced from outdoors by the first intake duct D1 and the third intake duct D3. The air exhausted from the exhaust pipe 9 is fed to an exhaust gas processing device (not illustrated).

As illustrated in FIG. 2, in the non-deposition step, air is not introduced into the reaction container 10. Therefore, air does not need to be exhausted from the reaction container exhaust duct 18. In addition, when the burner B is fired before transition from the non-deposition step to the deposition step, combustion gas (generally, hydrogen) is blown from the burner B. At this time, it is desirable that a large amount of combustion gas is not fed to the exhaust gas processing device. In this case, the seal portion 19 seals the exhaust port 18*a* of the reaction container exhaust duct 18.

Even when the exhaust port 18*a* is sealed by the seal portion 19, it is desirable that a fixed amount of air is introduced into the exhaust gas processing device. In this case, the second intake duct D2 is connected to the exhaust pipe 9, and air introduced from outdoors into the second intake duct D2 is fed to the exhaust gas processing device through the exhaust pipe 9.

This way, in the deposition step, air where the cleanliness is high (air where the number of particles is small) is intermittently introduced into the reaction container 10, and the same amount of air as that of the introduced air is exhausted from the reaction container 10. In addition, in the non-deposition step, by sealing the exhaust port 18*a* with the seal portion 19, air is not exhausted from the reaction container 10.

In the device for manufacturing a glass particle deposit disclosed in JP2012-166992A, the air of the reaction container may be introduced from the clean room. In this case, the introduction duct may be opened into the clean room. As a result, the air where the cleanliness is high can be introduced into the reaction container.

However, when the air where the cleanliness is high is introduced from the clean room, air needs to be introduced into the clean room by the amount of the air exhausted from the clean room. When air is introduced into the clean room, the air passes through the clean room filter. Therefore, the clean room filter needs to be appropriately replaced. In general, a plurality of reaction containers are connected to a common clean room. Therefore, during the replacement of the clean room filter, the operations of all the reaction containers stop.

In addition, when the clean room includes the air conditioner, cost or labor relating to the operation of the air conditioner is generated. The cost or the labor relating to the operation of the air conditioner refers to a power cost of an air-conditioning facility, an operation cost of a cold source, a heat source, or both thereof, cost or effort relating to maintenance work or the like. The cost or the labor increases as the amount of the air introduced into the clean room (in other words, the air where the temperature and the humidity are adjusted) increases. In consideration of the above-described point, the present inventors found the method for manufacturing a glass particle deposit and the configuration of the device 1 for manufacturing a glass particle deposit in which an overall operation rate of manufacturing facilities relating to the present disclosure is improved.

With this method for manufacturing a glass particle deposit according to the present embodiment, air to be introduced into the reaction container 10 is introduced from the space different from the clean room 2. Since air to be introduced into the reaction container 10 passes through the reaction container filter 16, the cleanliness of the air to be introduced into the reaction container 10 can be adjusted. By reducing the amount of air exhausted from the clean room 2, the amount of air passing through the clean room filter 3 is also reduced. As a result, the frequency of operation stop of the reaction container 10 caused by replacement of the clean room filter 3 is also reduced, and thus the overall operation rate of manufacturing facilities can be improved.

By providing the reaction container filter 16, the reaction container filter 16 needs to be appropriately replaced. However, as compared to a case where the operations of all the reaction containers 10 connected to the clean room 2 stop during the replacement of the clean room filter 3, the operation of only the reaction container 10 where the reaction container filter 16 is provided needs to stop during the replacement of the reaction container filter 16. Therefore, the overall operation rate of manufacturing facilities is improved.

The clean room 2 includes the air conditioner 4 capable of adjusting the temperature and the humidity. In the deposition step of the method for manufacturing a glass particle deposit according to the present embodiment, consumption of air where the temperature and the humidity are adjusted is suppressed. Therefore, cost and labor relating to the operation of the air conditioner 4 can be reduced.

In the method for manufacturing a glass particle deposit according to the present embodiment, outdoor air is directly introduced into the reaction container 10 by the introduction duct 15, and thus the method can be implemented with a simple configuration.

In addition, in the present embodiment, in the step (non-deposition step) other than the deposition step, by sealing the exhaust port 18*a* with the seal portion 19, air in the reaction container 10 is not exhausted. Accordingly, the lifetime of the reaction container filter 16 increases.

In the device 1 for manufacturing a glass particle deposit according to the present embodiment, the introduction duct 15 introduces air from the space different from the clean room 2 into the reaction container 10. Therefore, consumption of air in the clean room 2 can be suppressed. As a result, the lifetime of the clean room filter 3 that adjusts the cleanliness in the clean room 2 increase, and thus the overall operation rate of manufacturing facilities is improved.

Second Embodiment

Figure 3:
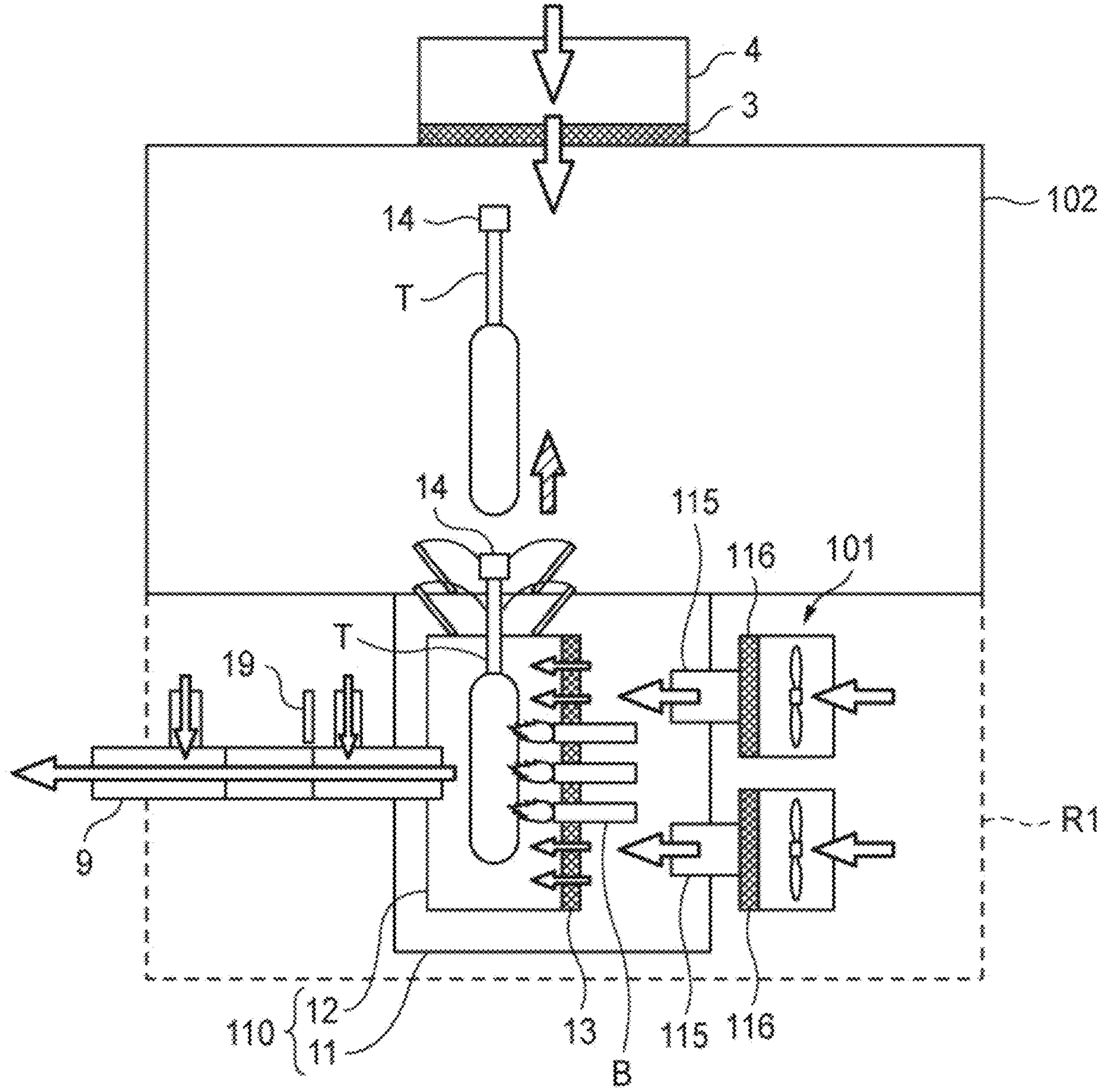
FIG. 3 is a diagram illustrating a glass particle deposit manufacturing device according to a second embodiment.

Next, a method for manufacturing a glass particle deposit according to a second embodiment will be described. In the second and subsequent embodiments, the same components as those of the first embodiment will be represented by the same reference numerals, and the detailed description thereof will not be repeated. FIG. 3 is a diagram illustrating a device 101 for manufacturing a glass particle deposit according to the second embodiment. A reaction container 110 of the device 101 for manufacturing a glass particle deposit according to the second embodiment is provided in a room R1 downstairs of a clean room 102. The introduction duct 15 according to the first embodiment is opened outdoors to introduce outdoor air. However, an introduction duct 115 according to the second embodiment is different from the introduction duct 15 in that the introduction duct 115 is opened to the indoor space (room R1) different from the clean room 102. The introduction duct 115 introduces indoor air into the reaction container 110 through a reaction container filter 116. Outdoor air may be introduced into the room R1 without adjusting the cleanliness, or may be introduced into the room R1 through a filter coarser than the clean room filter 3 that adjusts the cleanliness in the clean room 102. In addition, the temperature and the humidity of air in the room R1 do not need to be adjusted.

In the method for manufacturing a glass particle deposit according to the present embodiment, the introduction duct 115 takes in indoor air and introduces the air into the reaction container 110. Therefore, as compared to a case where air is directly taken in from outdoors, the effect of an outdoor environment such as outdoor wind can be reduced.

In addition, when air is introduced from outdoors into the room R1 through the filter (not illustrated) coarser than the reaction container filter 116, clogging of the reaction container filter 116 can be suppressed. Therefore, the lifetime of the reaction container filter 116 increases.

Third Embodiment

Figure 4:
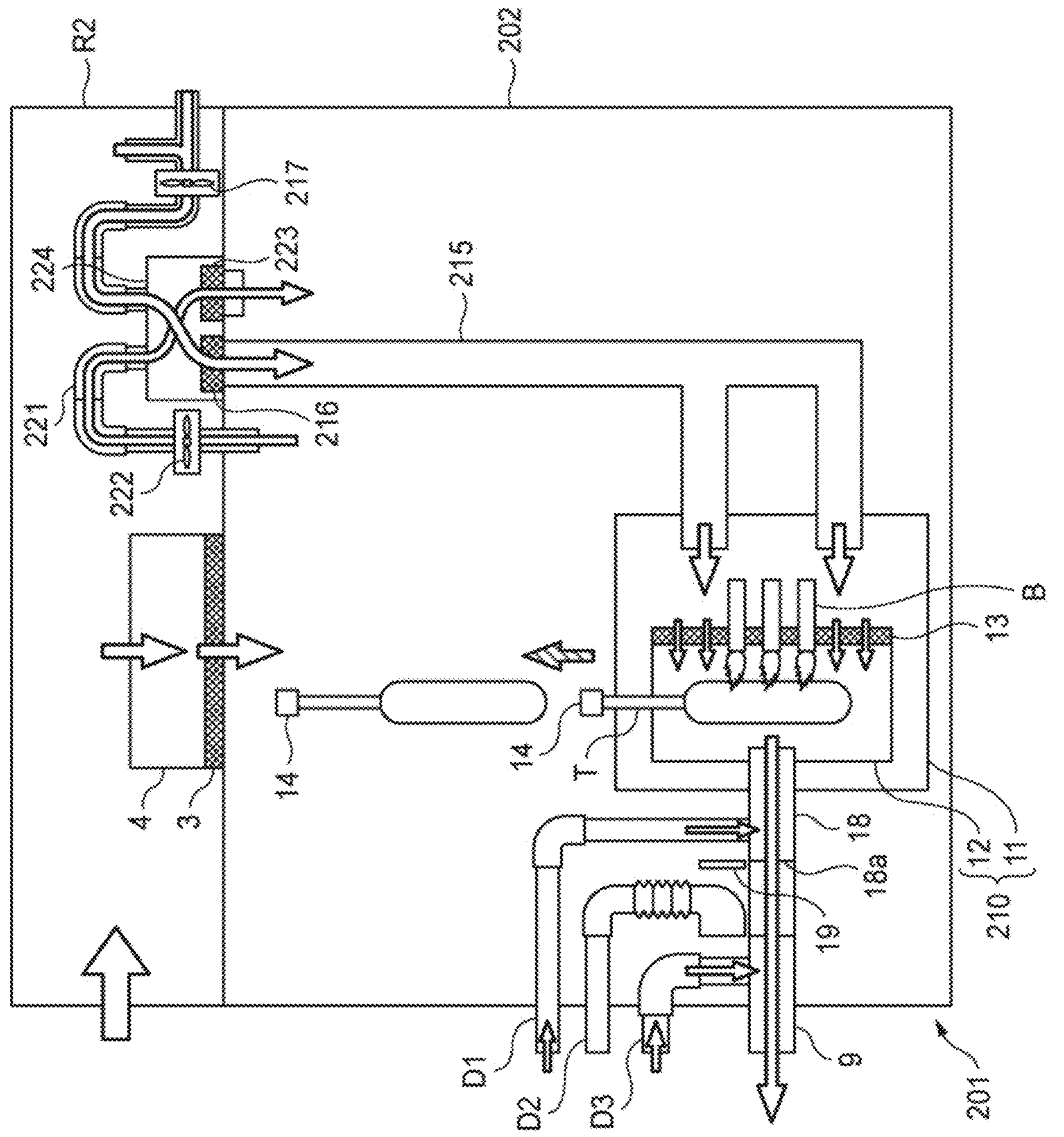
FIG. 4 is a diagram illustrating a glass particle deposit manufacturing device according to a third embodiment.

Next, a method for manufacturing a glass particle deposit according to a third embodiment will be described. FIG. 4 is a diagram illustrating a device 201 for manufacturing a glass particle deposit according to the third embodiment. A reaction container 210 of the device 201 for manufacturing a glass particle deposit according to the third embodiment is provided in a clean room 202, and an introduction duct 215 is opened outdoors and to an indoor space (room R2) that is provided upstairs of the clean room 202 and is different from the clean room 202. The introduction duct 215 takes in indoor air from an opening of the room R2 or takes in outdoor air from an outdoor opening by performing adjustment with a valve to introduce the air into the reaction container 210. In the third embodiment, the introduction duct 215 has a structure where one duct is branched halfway. Therefore, air is introduced from two positions into the reaction container 210. In the introduction duct 215, an introduction fan 217 for taking in air of the room R2 or outdoor air is provided. The air taken into the introduction duct 215 by the introduction fan 217 is introduced into the reaction container 210 through a reaction container filter 216. Outdoor air may be introduced into the room R2 without adjusting the cleanliness, or the air may be introduced into the room R2 through a filter coarser than the clean room filter 3 that adjusts the cleanliness in the clean room 202. In addition, the temperature and the humidity of air in the room R2 do not need to be adjusted.

The clean room 202 includes a circulation path 221 for circulating air in the clean room 202. In the circulation path 221, a circulation fan 222 for taking in air in the clean room 202 is provided. The air taken into the circulation path 221 by the circulation fan 222 returns to the clean room 202 again through a circulation path filter 223 provided halfway the circulation path 221. By circulating the air through the circulation path filter 223, the cleanliness in the clean room 202 can be maintained for a longer period of time.

In addition, total heat exchange is performed between air passing through the circulation path 221 and air passing through the introduction duct 215 by a total heat exchanger 224. The total heat exchange refers to exchange of the temperatures, the humidities, or both thereof. In other words, in the total heat exchange, only the temperatures may be exchanged, only the humidities may be exchanged, or the temperatures and the humidities may be exchanged.

By performing total heat exchange between air passing through the circulation path 221 and air passing through the introduction duct 215 using the total heat exchanger 224, the operation cost of the air conditioner 4 can be reduced. Hereinafter, the reason for this will be described using a specific example.

In general, when outdoor air has a higher temperature and a higher humidity than the inside of the clean room 202, air introduced into the clean room 202 is cooled first to a temperature lower than the temperature of the air in the clean room 202. As a result, the amount of saturated water vapor of the air introduced into the clean room 202 is reduced, and a part of the water vapor in the air is condensed. By removing the condensed water, the amount of water vapor in the air is reduced, and thus the humidity is reduced. Next, the air is heated to the temperature of the air in the clean room 202. By appropriately adjusting this principle and using the adjusted principle, the air in the clean room 202 can be adjusted to have an appropriate temperature and an appropriate humidity.

This way, for example, when the humidity is adjusted, the air may be cooled to a temperature lower than the appropriate temperature or may be conversely heated to a temperature higher than the appropriate temperature by the air conditioner 4. In this case, by performing the total heat exchange with the air introduced into the reaction container 210, the adjustment of the temperature and the humidity of the air in the clean room 202 by the air conditioner 4 can be assisted. Therefore, the operation load and the operation cost of the air conditioner 4 can be reduced. In addition, in order to more effectively assist the adjustment of the temperature and the humidity, as the air introduced into the reaction container 210, air introduced from the room R2 and air introduced from outdoors may be switched or mixed with each other.

This way, in the method for manufacturing a glass particle deposit according to the present embodiment, the air introduced into the reaction container 210 also contributes to the adjustment of the temperature and the humidity of the air in the clean room 202. As a result, load and cost relating to the operation of the air conditioner 4 can be reduced.

EXAMPLES

Next, the method for manufacturing a glass particle deposit in the related art (hereinafter, referred to as Comparative Example) and the method for manufacturing a glass particle deposit according to any one of the first embodiment to the third embodiment are compared to each other for the lifetime of the clean room filter. Comparative Example is a method of exhausting the air from the clean room and introducing the air into the reaction container in the deposition step.

The above-described four embodiments including Comparative Example are compared to each other for the amount of air exhausted from the clean room, the operation load of the air conditioner, the lifetime of the clean room filter, characteristics of the air introduced into the reaction container, the cleanliness of the clean room, and the optical fiber quality defect occurrence frequency. The results are shown in Table 1. The amount of air exhausted from the clean room, the operation load of the air conditioner, the lifetime of the clean room filter, and the optical fiber quality defect occurrence frequency show approximate ratios assuming that all the values of Comparative Example are 1. The cleanliness of the clean room shows the approximate ratio of the number of dusts assuming that the number of dusts in Comparative Example is 1. "The optical fiber quality defect occurrence frequency" shows the degree of occurrence of defective products when an optical fiber is prepared based on the glass particle deposit manufactured in each of the methods. In addition, "the characteristics of the air introduced into the reaction container" are compared and shown from the viewpoints of the cleanliness, the temperature, and the humidity. Among these, the cleanliness shows the number of dusts.

TABLE 1

| | | Comparative Example | First Embodiment | Second Embodiment | Third Embodiment |
|---|---|---|---|---|---|
| Amount of Air Exhausted from Clean Room | | 1 | 0.1 or less | 0.05 or less | 0.05 or less |
| Operation Load of Air Conditioner | | 1 | 0.1 or less | 0.05 or less | 0.04 or less |
| Lifetime of Clean Room Filter | | 1 | 10 | 20 | 20 |
| Characteristics of Air Introduced into Reaction Container | Cleanliness | 100 or less | 100 or less | 100 or less | 100 or less |
| | Temperature | 20 to 30° C. | 0 to 40° C. | 0 to 40° C. | 10 to 35° C. |
| | Humidity | 20 to 60% | 10 to 100% | 10 to 100% | 15 to 95% |
| Cleanliness of Clean Room | | 1 | 1.2 | 1.2 | 1 |
| Optical Fiber Quality Defect Occurrence Frequency | | 1 | 1 | 1 | 1 |

As shown in Table 1, the amount of air exhausted from the clean room in the first embodiment is 0.1 times or less that of Comparative Example. In addition, the amounts of air exhausted from the clean room in the second embodiment and the third embodiment are 0.05 times or less that of Comparative Example.

The amount of air newly introduced into the clean room is the same as the amount of air exhausted from the clean room. Therefore, in the manufacturing methods according to the first embodiment to the third embodiment, the operation load of the air conditioner is reduced, and the lifetime of the clean room filter increases.

Specifically, the operation load of the air conditioner has a substantially proportional relationship with the amount of air exhausted from the clean room. That is, the operation load of the air conditioner in the first embodiment is 0.1 times or less that of Comparative Example. That is, the operation loads of the air conditioner in the second embodiment and the third embodiment are 0.05 times or less that of Comparative Example.

On the other hand, the lifetime of the clean room filter has a substantially inverse proportional relationship with the amount of air exhausted from the clean room. That is, the lifetime of the clean room filter in the first embodiment is about 10 times that of Comparative Example. In addition, the lifetimes of the clean room filters in the second embodiment and the third embodiment are about 20 times that of Comparative Example.

Incidentally, as shown in Table 1, regarding the characteristics of the air introduced into the reaction container and the cleanliness of the clean room, there are differences between Comparative Example and each of the embodiments.

Regarding the cleanliness, the air is introduced into the reaction container through the filter. Therefore, a difference in cleanliness is relatively small in any example. However, regarding the temperature and the humidity, a difference between Comparative Example and each of the embodiments is relatively large.

In Comparative Example, the temperature and the humidity are adjusted by the air conditioner. Therefore, air where the temperature is 20° C. or higher and 30° C. or lower and the humidity is 20% or more and 60% or less is introduced into the reaction container.

On the other hand, in the first embodiment and the second embodiment, the temperature and the humidity of the air introduced into the reaction container are not adjusted. Accordingly, in both of the embodiments, air where the temperature is 0°° C. or higher and 40° C. or lower and the humidity is 10% or more and 100% or less is introduced into the reaction container.

In addition, in the third embodiment, total heat exchange is performed by the total heat exchanger. As a result, as compared to the first embodiment and the second embodiment, the ranges of the temperature and the humidity of the air introduced into the reaction container are small. In the third embodiment, air where the temperature is 5° C. or higher and 35° C. or lower and the humidity is 15% or more and 95% or less is introduced into the reaction container.

In addition, regarding the cleanliness of the clean room, there are differences between Comparative Example and the third embodiment and between the first embodiment and the second embodiment.

In Comparative Example, the air in the clean room is exhausted and is introduced into the reaction container. Air corresponding to the amount of the air exhausted from the clean room is introduced from outdoors through the clean room filter. As a result, the frequency of circulation of air is higher than those of the first embodiment and the second embodiment, and thus the cleanliness is also lower than those of the first embodiment and the second embodiment.

In other words, in the first embodiment and the second embodiment, the amount of air exhausted from the clean room is small, and thus the value of the cleanliness is higher than that of Comparative Example by about 20%.

On the other hand, in the third embodiment, the air in the clean room is circulated by the circulation path. In addition, the circulation path filter is provided in the circulation path, and can remove particles of air passing through the circulation path. As a result, the cleanliness of the clean room is the same as that of Comparative Example.

This way, in Comparative Example and each of the embodiments, glass particle deposits are manufactured under different conditions in terms of the characteristics of the air introduced into the reaction container and the cleanliness of the clean room. However, as shown in Table 1, irrespective of the method for manufacturing a glass particle deposit, the optical fiber quality defect occurrence frequency does not substantially change. That is, the result shows that the glass particle deposit having the same quality as that of Comparative Example can be provided using the method for manufacturing a glass particle deposit according to the present disclosure.

Although the present disclosure has been described in detail with reference to specific embodiments, it will be apparent to those skilled in the art that various changes and modifications can be made without departing from the spirit and scope of the disclosure. In addition, the numbers, positions, shapes, and the like of the components described above are not limited to those of the embodiments and can be changed to numbers, positions, shapes, and the like suitable for implementing the present disclosure.

For example, in all the embodiments that describe the present disclosure, the examples where a glass particle deposit is manufactured using an OVD method have been described. However, the present disclosure is not limited to the examples of the embodiments and is also applicable to a case where a glass particle deposit is manufactured using another chemical vapor deposition method.

What is claimed is:

1. A method for manufacturing a glass particle deposit, the method comprising:

manufacturing the glass particle deposit by producing glass particles through a hydrolysis reaction using flame of a burner and depositing the glass particles on a target in a reaction container; and taking out the glass particle deposit from the reaction container and transporting the glass particle deposit to a clean room, wherein air is introduced into the clean room through a clean room filter that removes particles in the air, and when the glass particle deposit is manufactured, air is introduced from a space different from the clean room into the reaction container through a reaction container filter, wherein an intake duct opened outdoors and an exhaust port of the reaction container are switchably connected to an exhaust pipe, when the manufacturing of the glass particle deposit starts, the exhaust pipe is connected to the exhaust port, and when the manufacturing of the glass particle deposit ends, the exhaust pipe is connected to the intake duct to seal the exhaust port.

2. The method for manufacturing a glass particle deposit according to claim 1, wherein air is introduced into the clean room through an air conditioner capable of adjusting a temperature and a humidity.

3. The method for manufacturing a glass particle deposit according to claim 1, wherein when the glass particle deposit is manufactured, air that is taken in from an introduction duct opened outdoors is introduced into the reaction container.

4. The method for manufacturing a glass particle deposit according to claim 1, wherein when the glass particle deposit is manufactured, air that is taken in from an introduction duct opened to a room different from the clean room and the reaction container is introduced into the reaction container.

5. The method for manufacturing a glass particle deposit according to claim 1, wherein when the glass particle deposit is manufactured, total heat exchange is performed between the air introduced into the reaction container and the air in the clean room, wherein the total heat exchange refers to exchange of temperatures, humidities, or both temperatures and humidities.

* * * * *